United States Patent
McGuffin

(10) Patent No.: US 10,263,688 B2
(45) Date of Patent: Apr. 16, 2019

(54) METHOD TO DETECT WHEN VEHICLE IS OUT OF LOS DATALINK NETWORK AREA SO MESSAGES FROM VEHICLE CAN BE PROACTIVELY DIRECTED TO DIFFERENT AVAILABLE NETWORK

(71) Applicant: Honeywell International Inc., Morris Plains, NJ (US)

(72) Inventor: Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/597,434

(22) Filed: May 17, 2017

(65) Prior Publication Data

US 2018/0337719 A1  Nov. 22, 2018

(51) Int. Cl.
*H04B 7/185* (2006.01)
*H04L 29/08* (2006.01)
*H04B 7/155* (2006.01)
*H04W 84/06* (2009.01)

(52) U.S. Cl.
CPC ......... *H04B 7/18506* (2013.01); *H04B 7/155* (2013.01); *H04L 67/12* (2013.01); *H04W 84/06* (2013.01)

(58) Field of Classification Search
CPC ..... H04B 7/18506; H04B 7/155; H04L 67/12; H04L 12/6418; H04L 47/20; H04L 47/2475; H04L 67/125; H04L 67/303; H04L 69/165; H04W 84/06; G08G 5/0013
USPC .......................................................... 455/9
See application file for complete search history.

(56) References Cited

U.S. PATENT DOCUMENTS

| | | |
|---|---|---|
| 6,178,207 B1 * | 1/2001 | Richards .................. G01S 5/14 342/450 |
| 8,019,338 B2 | 9/2011 | Malaga et al. |
| 8,195,813 B2 | 6/2012 | Gruyer et al. |
| 2009/0303083 A1 * | 12/2009 | Leclercq ........... H04B 7/18506 340/945 |
| 2014/0300495 A1 * | 10/2014 | Scheu ................. G08G 5/0021 340/961 |

* cited by examiner

*Primary Examiner* — Shaima Q Aminzay
(74) *Attorney, Agent, or Firm* — Fogg & Powers LLC

(57) ABSTRACT

A method for vehicle communications is disclosed. The method comprises monitoring, in a vehicle during travel, line of sight (LOS) datalink messages sent to one or more other vehicles from one or more ground stations in a LOS datalink network coverage area, and calculating a rate in which the LOS datalink messages are sent to the other vehicles. The method detects that the vehicle is substantially out of the LOS datalink network coverage area, when the LOS datalink messages rate drops below a threshold value. Messages are transmitted from the vehicle over a different available network when the vehicle is substantially out of the LOS datalink network coverage area.

9 Claims, 6 Drawing Sheets

US 10,263,688 B2

METHOD TO DETECT WHEN VEHICLE IS OUT OF LOS DATALINK NETWORK AREA SO MESSAGES FROM VEHICLE CAN BE PROACTIVELY DIRECTED TO DIFFERENT AVAILABLE NETWORK

BACKGROUND

Oceanic flights use Air Traffic Control (ATC) datalink applications called Future Air Navigation System (FANS) 1/A. Currently, such ATC datalink applications are required in some oceanic regions like the north Atlantic. The use of these ATC datalink applications begins while the aircraft is still within range of land based datalink Very High Frequency (VHF) ground stations, which use the Aircraft Communications Addressing and Reporting System (ACARS), such as Plain Old ACARS (POA), or VHF DataLink (VDL) mode 2 ACARS over Aviation VHF Link Control (AVLC) (AOA).

As the aircraft flies into remote areas without VHF coverage (like northern Canada) or out over the ocean, the datalink communications transition to datalink satellite communications (SATCOM). The datalink communications transition logic is reactive in current avionics systems. When an avionics system sends a downlink message via VHF and does not receive a response, even after performing all of the retries, then the downlink message is transmitted via SATCOM. This retry process can take longer than 90 seconds. The required communication performance (RCP) for Automatic Dependent Surveillance-Contract (ADS-C), one of the FANS 1/A applications, is that 95% of the downlink reports must be received within 90 seconds.

The Federal Aviation Administration (FAA) monitors the RCP of the aircraft in FAA oceanic airspace. Problem reports are written against aircraft that consistently fail to meet the RCP of 95% within 90 seconds, and the aircraft will be denied use of preferred tracks, which will increase the flight time and cost (e.g., increased crew pay, increased fuel cost). A typical flight across the north Atlantic generates 10-20 ADS-C reports. If one or more of the reports is delayed, then the aircraft will not meet RCP.

While there are various causes for report delays, such as satellite switching, multiple downlink reports, etc., the VHF to SATCOM transition is the biggest cause of delays. Some geographic regions have offered to help with the transition, but it is difficult to accurately define the boundary for the transition (e.g., coastlines are very irregular). The VHF coverage along coastlines depends on where the VHF ground stations are located. In addition, coverage changes as new VHF ground stations are deployed and old VHF ground stations are decommissioned. Any maps of such ground stations would need to be tailored for each service provider. Another problem is that switching to SATCOM early will increase the communication cost, because SATCOM is significantly more expensive than VHF.

SUMMARY

A method for vehicle communications is disclosed. The method comprises monitoring, in a vehicle during travel, line of sight (LOS) datalink messages sent to one or more other vehicles from one or more ground stations in a LOS datalink network coverage area, and calculating a rate in which the LOS datalink messages are sent to the other vehicles. The method detects that the vehicle is substantially out of the LOS datalink network coverage area, when the LOS datalink messages rate drops below a threshold value. Messages are transmitted from the vehicle over a different available network when the vehicle is substantially out of the LOS datalink network coverage area.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
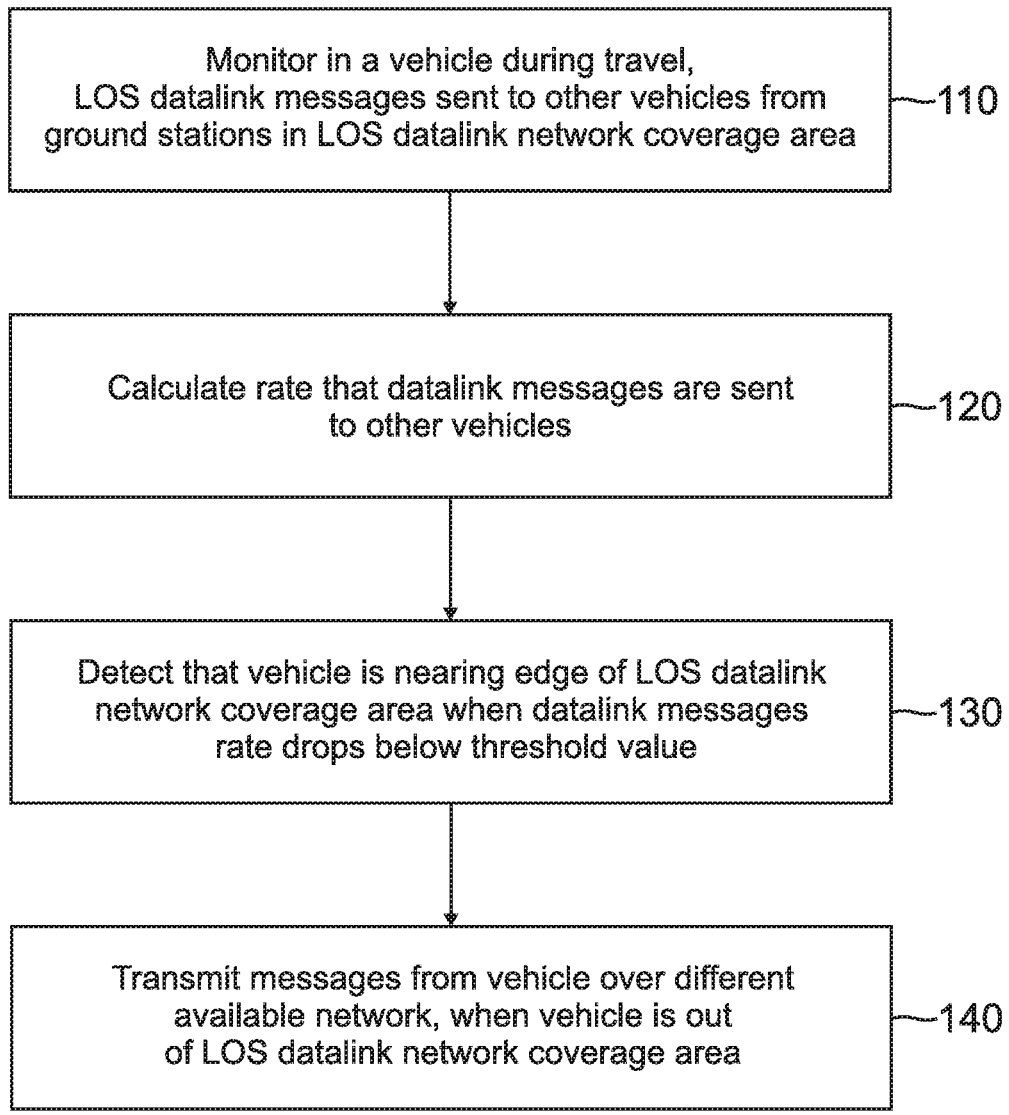
FIG. 1 is a flow diagram of a method for allowing a vehicle to detect when it is out of a line of sight (LOS) datalink network coverage area.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods systems are disclosed herein that allow a vehicle such as an aircraft to detect when it is out of a line of sight (LOS) datalink network coverage area such as a very high frequency (VHF) datalink network coverage area. This allows the vehicle datalink router to proactively direct messages to a different available network, such as a satellite communications (SATCOM) network, or other long range communications protocol (e.g., high frequency (HF) network), when the vehicle is out of the LOS datalink network coverage area.

The present approach detects a cost effective time when communications should be switched from VHF ground station coverage to a SATCOM/HF network, for example. This proactive switching provides the benefit of meeting performance requirements while lowering costs.

While the present methods are primarily described herein with respect to use with an aircraft, it should be understood that the methods apply equally to other types of vehicles that are operated with datalink messaging capability.

In one approach, the method monitors, in an aircraft during flight, the VHF uplink messages sent to other aircraft from the ground stations in a VHF datalink network coverage area; calculates the uplink message rate to the other aircraft; and when possible, determines the quantity and/or location of ground stations from which the uplink messages are heard. The method detects that the aircraft is substantially out of the VHF datalink network coverage area, when the uplink message rate or ground station data drops below a first threshold value. The downlink messages from the aircraft are then transmitted through a SATCOM network, for example. The method can also detect when the aircraft is again in a coverage area of a VHF datalink network, when the uplink message rate is above a second threshold value. At this point, the aircraft transmits downlink messages over the VHF datalink network. The first threshold value and the second threshold value can either be the same value or can be different values.

There are several variations of the present technique based on the type of VHF network being used. In one approach that utilizes a Plain Old ACARS (POA) category A (also called VHF DataLink (VDL) mode 0/A) VHF network, which has no ground station identification or location data, the aircraft datalink router relies on the uplink message rate. The aircraft datalink router monitors uplinks to all aircraft in the area from all ground stations on that VHF frequency, and monitors the uplink rate per unit time. As the aircraft approaches the edge of VHF coverage, the number of uplinks per unit time decreases and can be used to predict when the aircraft will fly out of VHF coverage. The aircraft datalink router can use this information to route downlink messages to a SATCOM network without incurring the delay caused by VHF retransmissions.

In another approach, which is utilized when the VHF network is POA category B, or VDL 2 (VDL mode 2) AOA (ACARS Over Aviation VHF Link Control (AVLC)), in which each ground station is uniquely identified and the aircraft datalink router can use that information instead of the uplink rate or to complement the uplink rate. The aircraft datalink router maintains a count of the number of unique ground stations heard in each timer period. As the aircraft approaches the edge of VHF coverage, the number of unique grounds station heard will decrease, and can be used to predict when the aircraft will fly out of VHF coverage. The aircraft datalink router can then use this information to route downlink messages to a SATCOM network.

In a further approach, ground station location data provided by ground stations in a VHF POA category B or VDL 2 AOA network is used. As the quantity of ground stations decreases, the aircraft datalink router can monitor the location of the remaining ground stations, and it will become evident, as the aircraft approaches the edge of VHF coverage, that the few remaining ground stations heard are all behind the aircraft. This information can be used to confirm pending lack of VHF coverage and expedite directing of messages to a SATCOM network.

The present methods provide improved VHF to SATCOM switching by being proactive and predictive, instead of reactive as in prior approaches, while minimizing the communication costs, such as for Future Air Navigation System (FANS) 1/A messages. This will improve communication performance requirements and increase the chances that an aircraft will continue to qualify to use preferred tracks, such as the preferred north Atlantic tracks, which will also save money (over having to use the outside tracks).

Further details of the present approach are described hereafter with reference to the drawings.

FIG. 1 is a flow diagram representing a method 100 for vehicle communications, which allows a vehicle such as an aircraft to detect when it is out of a LOS datalink network coverage area, such as a VHF datalink network coverage area. The method 100 monitors, in the vehicle during travel, LOS datalink messages sent to other vehicles from ground stations in a LOS datalink network coverage area (block 110). For example, method 100 can monitor VHF uplink messages that are sent to other airborne vehicles from ground stations in a VHF datalink network coverage area. The method 100 calculates a rate that the datalink messages are sent to the other vehicles (block 120).

The method 100 detects that the vehicle is substantially out of the LOS datalink network coverage area, when the datalink messages rate drops below a threshold value (block 130). For example, method 100 can detect that the aircraft is nearing the edge of the VHF datalink network coverage area, when the VHF uplink messages rate drops below a threshold value. Messages are then transmitted from the vehicle over a different available network when the vehicle is substantially out of the LOS datalink network coverage area (block 140). For example, downlink messages can be sent from the aircraft by a datalink router to a SATCOM network, a HF network, or other long range communications protocol operative beyond LOS, when the aircraft is substantially out of the VHF datalink network coverage area. The datalink router can be located in a Communication Management Unit (CMU) or a Communication Management Function (CMF) of the aircraft.

Figure 2A:
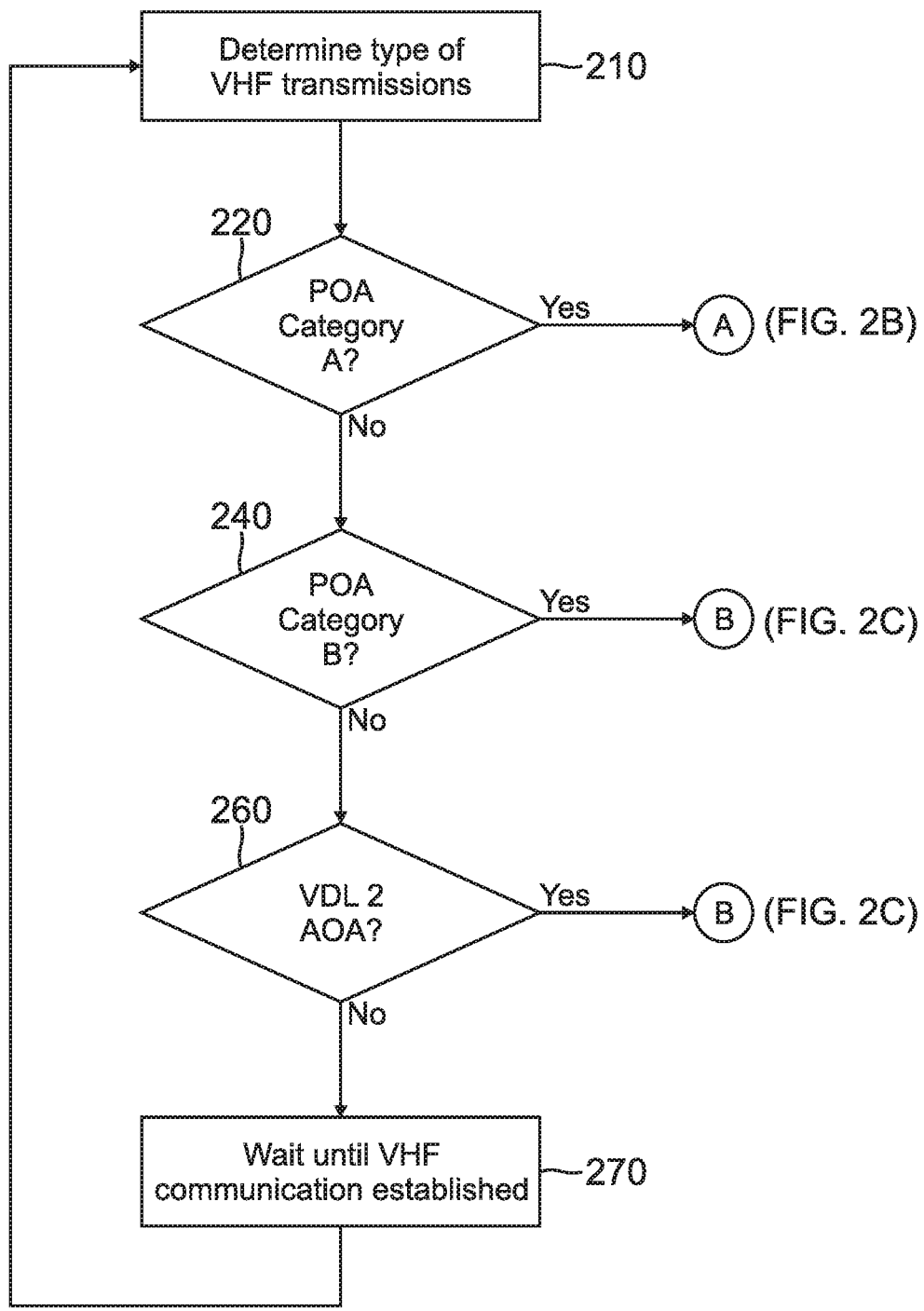
FIGS. 2A-2C are flow diagrams illustrating methods for allowing an aircraft to detect when it is flying out of a very high frequency (VHF) datalink network coverage area.
Figure 2B:
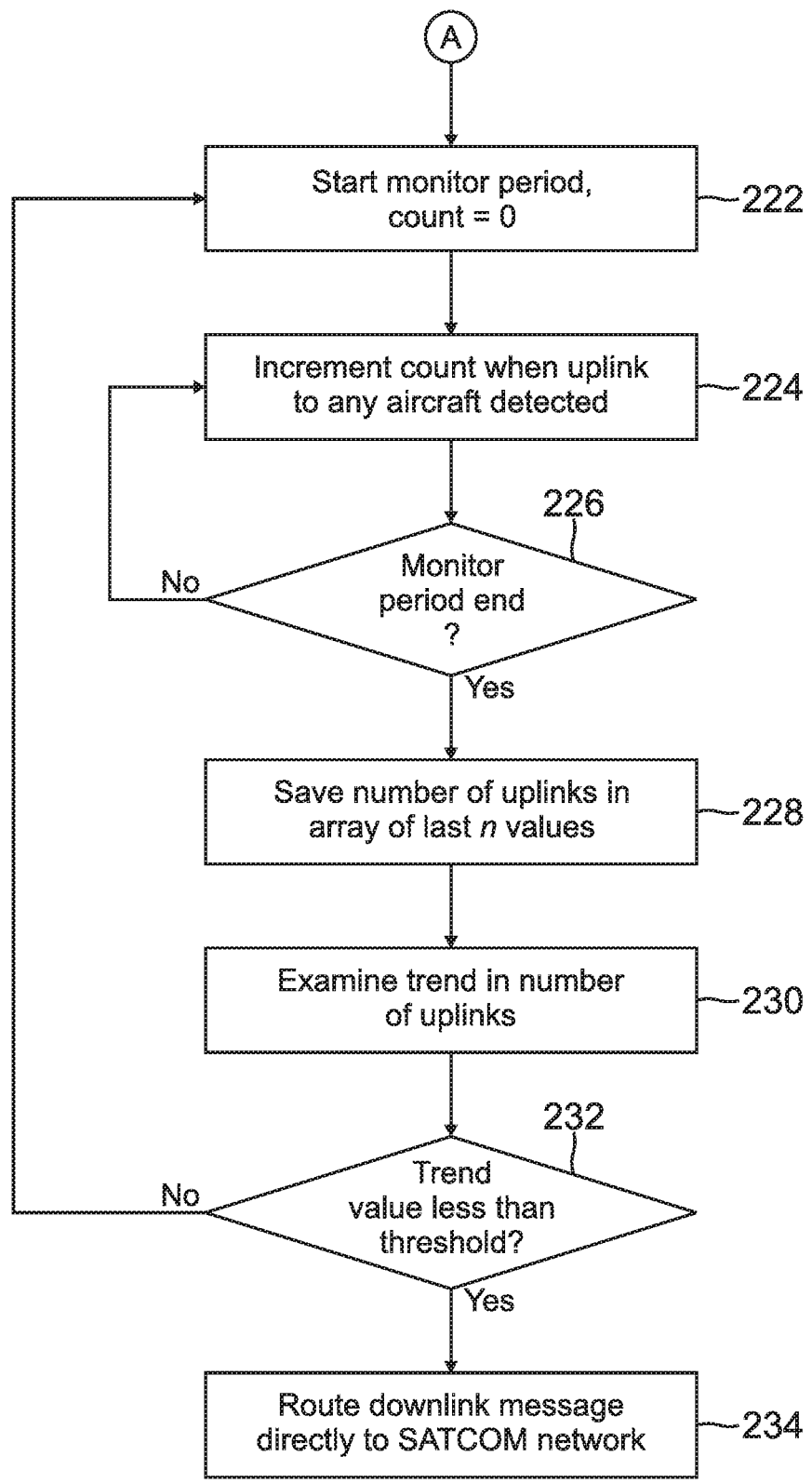
Figure 2C:
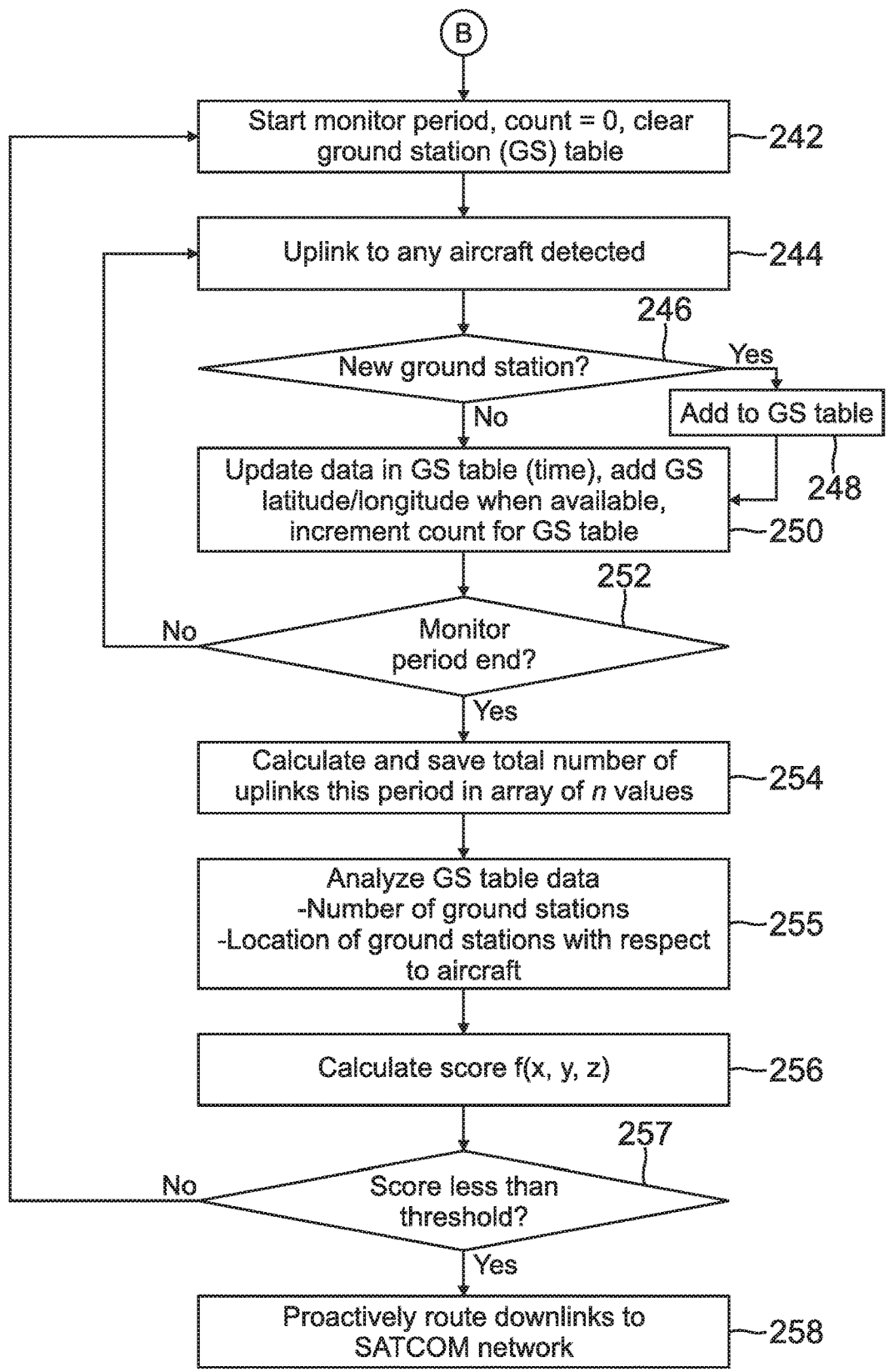

FIGS. 2A-2C are flow diagrams illustrating methods for allowing an aircraft to detect when it is flying out of VHF datalink coverage. As shown in FIG. 2A, the method initially determines the type of VHF transmissions to be monitored (block 210). If the determination is made that the type of VHF transmissions are POA (VDL mode 0/A) category A (block 220), with no ground station identification available, the method goes to subroutine A (FIG. 2B), which is discussed further hereafter. If the method determines that the type of VHF transmissions are not POA category A, the method determines whether the type of VHF transmissions are POA category B (block 240), in which each ground station has a unique identification. If yes, the method goes to subroutine B (FIG. 2C), which is discussed further hereafter. If the method determines that the type of VHF transmissions are not POA category B, the method determines whether the type of VHF transmissions are VDL 2 AOA (block 260). If yes, the method goes to subroutine B (FIG. 2C). If the method determines that the type of VHF transmissions are not VDL 2 AOA, the method waits until VHF communication is established (block 270). When VHF communication is established, the method repeats starting at block 210 to determine the type of VHF transmissions.

As discussed above, if a determination is made that the type of VHF transmissions are POA category A (block 220), the method goes to subroutine A, which is shown in FIG. 2B. There, a start monitor period is initiated, with an uplink count of 0 (block 222). The count is incremented when an uplink to any aircraft is detected (block 224). A determination is then made whether the monitor period has ended (block 226). If not, the method returns to block 224 and increments the count when an uplink to an aircraft is detected. If the monitor period has ended at block 226, the number of uplink counts is saved in array of last n values (block 228). The trend in the number of uplink counts is then examined (block 230). For example, the trend can be examined using data averaging, data filtering, data smoothing, or other known techniques. A determination is then made whether the trend value is less than a threshold (e.g., messages detected per minute) (block 232). If the trend value is not less than the threshold, the method returns to block 222 to start another monitor period and the above steps are repeated. If the trend value is less than the threshold, the method routes downlink messages directly to a SATCOM network (block 234).

As noted previously with respect to FIG. 2A, if a determination is made that the type of VHF transmissions are POA category B (block 240), the method goes to subroutine B, which is shown in FIG. 2C. There, a start monitor period is initiated, with an uplink count of 0, and a ground station (GS) table is cleared (block 242). When an uplink to any aircraft is detected (block 244), a determination is made whether the uplink is from a new ground station (block 246).

If yes, the new ground station is added to the GS table (block 248), and data in the GS table is updated, such as time, GS latitude/longitude when available, and a count for the GS table is incremented (block 250). If a new ground station is not detected at block 246, the method goes directly to block 250 to update the data in the GS table.

A determination is then made whether the monitor period has ended (block 252). If not, the method repeats starting at block 244 to detect an uplink to an aircraft. If the monitor period has ended at block 252, the method calculates and saves the total number of uplinks during this monitor period in an array of n values (block 254). The method then analyzes the GS table data (block 255), including the number of ground stations, and locations of the ground stations with respect to the monitoring aircraft (e.g., determining whether the ground stations are only behind the aircraft).

The method then calculate a score (block 256), and a determination is made whether the score is less than a threshold (block 257). If the score is not less than the threshold, the method returns to block 242 to the start monitor period again, and repeats the foregoing steps. If the score is less than the threshold, the method proactively routes downlink messages to a SATCOM network (block 258). In one example, the score can be calculated as $f(x,y,z)$, where x is the uplink rate, y is the number of ground stations, and z is the relative location of ground stations with respect to the location and heading of the aircraft. In addtion, different weights can be applied to data values to produce the score as desired.

As described previously for FIG. 2A, if a determination is made that the type of VHF transmissions are VDL 2 AOA (block 260), the method goes to subroutine B, and the steps are carried out as described above with respect to FIG. 2C.

Figure 3:
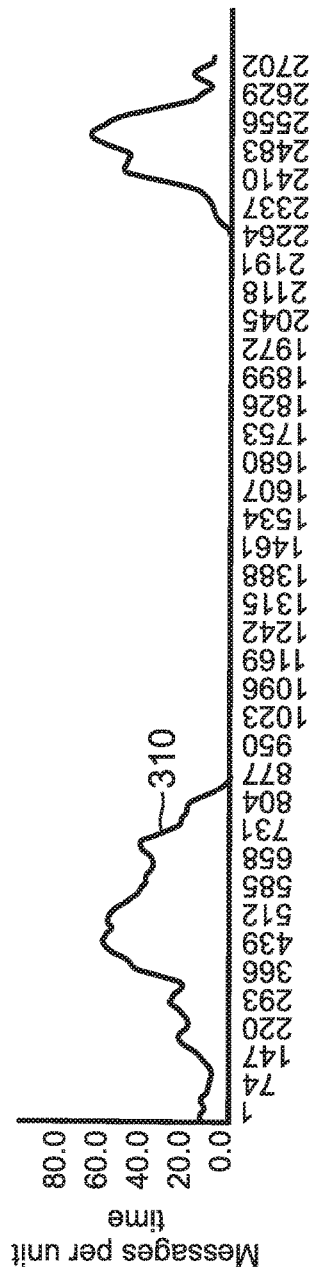
FIGS. 3-5 are graphs illustrating various aspects of the method for allowing an aircraft to detect when it is flying out of VHF datalink coverage.
Figure 4:
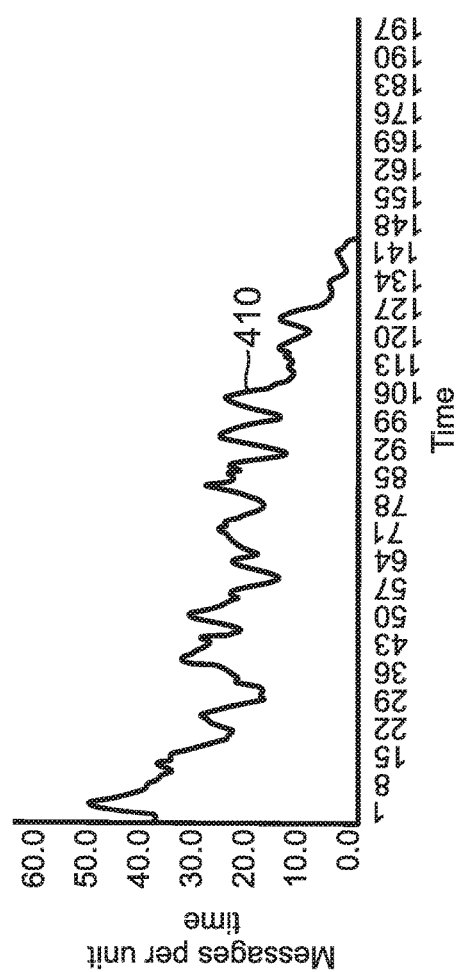
Figure 5:
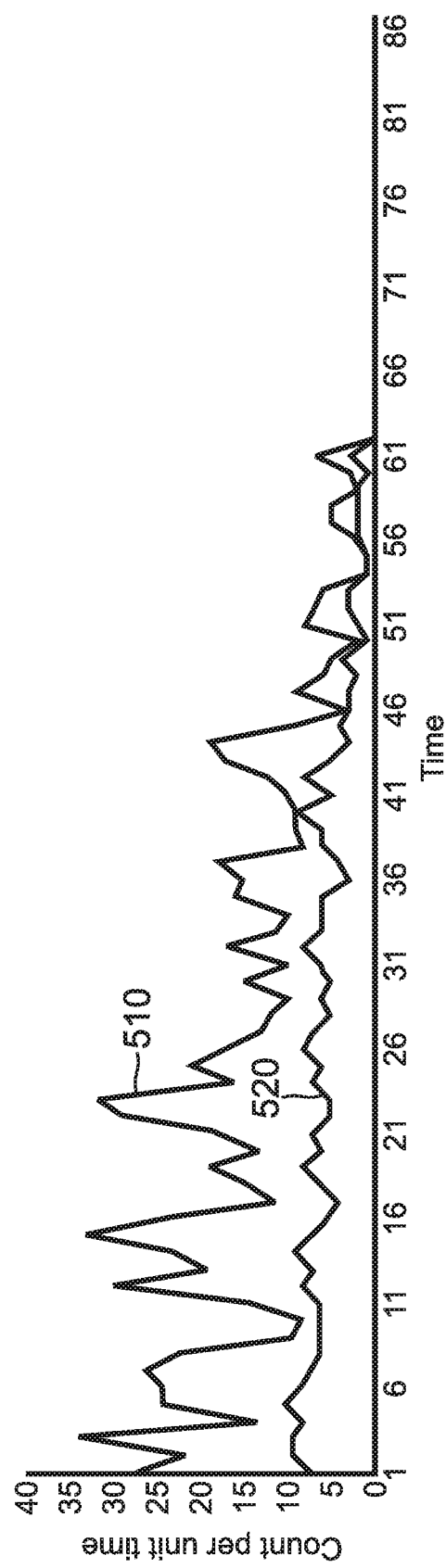

FIGS. 3-5 are graphs illustrating various aspects of the present method. In the data shown in FIGS. 3-5, the time interval is 15 seconds for the number uplink messages measured by an aircraft flying at a given altitude over a given time period. As can be seen in FIGS. 3-5, as an aircraft approaches the edge of VHF coverage, the number of messages per unit time decreases and can be used to predict when the aircraft will fly out of VHF coverage.

FIG. 3 is a data plot of the number of uplink messages per 15 seconds averaged over 10 minutes (line 310), measured by an aircraft when flying toward and over a remote area without VHF coverage. FIG. 3 clearly shows how a decreaseing uplink rate predicts that the aircraft is approaching the end of VHF coverage.

FIG. 4 includes the same data as FIG. 3, but shows the number of uplink messages per 15 seconds averaged over 1 minute (line 410), zoomed in on the VHF-SATCOM transition. FIG. 4 also clearly shows how a decreaseing uplink rate predicts that the aircraft is approaching the end of VHF coverage.

FIG. 5 includes the same data as FIG. 3, but shows the number of uplink messages per 15 seconds averaged over 1 minute (line 510) and the number of different ground stations heard per 15 seconds (line 520), zoomed in on the VHF-SATCOM transition. In FIG. 5, the downward trend in the number of ground stations is evident along with the downward trend in the uplink rate, clearly showing that the number of ground stations heard also decreases as the aircraft approaches the end of VHF coverage.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for vehicle communications, the method comprising: monitoring, in a vehicle during travel, line of sight (LOS) datalink messages sent to one or more other vehicles from one or more ground stations in a LOS datalink network coverage area; calculating a rate in which the LOS datalink messages are sent to the one or more other vehicles; detecting that the vehicle is substantially out of the LOS datalink network coverage area, when the LOS datalink messages rate drops below a first threshold value; and transmitting one or more messages from the vehicle over a different available network when the vehicle is substantially out of the LOS datalink network coverage area.

Example 2 includes the method of Example 1, wherein the LOS datalink messages comprise very high frequency (VHF) uplink messages, and the LOS datalink network coverage area comprises a VHF datalink network coverage area.

Example 3 includes the method of any of Examples 1-2, wherein the different available network comprises a satellite communications (SATCOM) network, a high frequency (HF) network, or other long range communications protocol operative beyond LOS.

Example 4 includes the method of any of Examples 1-3, wherein the vehicle comprises an aircraft, and the one or more other vehicles comprise one or more other aircraft.

Example 5 includes the method of Example 4, further comprising: detecting when the aircraft is again in a coverage area of a VHF datalink network, when a VHF datalink messages rate is above a second threshold value; and transmitting one or more VHF downlink messages from the aircraft over the VHF datalink network.

Example 6 includes the method of Example 5, wherein the first threshold value and the second threshold value are the same value.

Example 7 includes the method of Example 5, wherein the first threshold value and the second threshold value are different values.

Example 8 includes a system comprising: a processor onboard a vehicle; a datalink router onboard the vehicle and in operative communication with the processor; and a non-transitory computer readable medium having instructions stored thereon, executable by the processor, to perform a method for vehicle communications according to any of Examples 1-7.

Example 9 includes a system for datalink communications, the system comprising: a processor onboard an aircraft; a datalink router onboard the aircraft and in operative communication with the processor; and a non-transitory computer readable medium having instructions stored thereon, executable by the processor, to perform a method comprising: monitoring, in the aircraft during flight, VHF uplink messages sent to one or more other airborne vehicles from a plurality of ground stations in a VHF datalink network coverage area; maintaining a count number of the uplink messages detected during the monitoring; when the monitoring ends, saving the count number of the uplink messages; calculating a rate per unit time in which the uplink messages are received by the one or more other airborne vehicles based on the saved count number to determine a trend value; determining whether the trend value is less than a threshold value; and transmitting one or more downlink messages from the aircraft over a different available network, rather than via VHF, when the trend value is less than the threshold value.

Example 10 includes the system of Example 9, wherein the datalink router comprises a communications management unit (CMU), or a communications management function (CMF).

Example 11 includes the system of any of Examples 9-10, wherein the different available network comprises a SATCOM network, a HF network, or other long range communications protocol operative beyond line of sight.

Example 12 includes a system for datalink communications, the system comprising: a processor onboard an aircraft; a datalink router onboard the aircraft and in operative communication with the processor; and a non-transitory computer readable medium having instructions stored thereon, executable by the processor, to perform a method comprising: monitoring, in the aircraft during flight, VHF uplink messages sent to one or more other airborne vehicles from a plurality of ground stations in a VHF datalink network coverage area, wherein each of the ground stations provide their own unique identification; maintaining ground station data including a count number of the ground stations identified during the monitoring; when the monitoring ends, analyzing the ground station data to determine the count number of the ground stations; calculating a score based on the ground station data; determining whether the score is less than a threshold value; and transmitting one or more downlink messages from the aircraft over a different available network, rather than via VHF, when the score is less than the threshold value.

Example 13 includes the system of Example 12, wherein the datalink router comprises a CMU, or a CMF.

Example 14 includes the system of any of Examples 12-13, wherein the different available network comprises a SATCOM network, a HF network, or other long range communications protocol operative beyond line of sight.

Example 15 includes the system of any of Examples 12-14, wherein one or more of the ground stations transmit their location data, which is received and processed by the processor onboard the aircraft.

Example 16 includes the system of Example 15, wherein analyzing the ground station data includes determining a location of the one or more of the ground stations with respect to the aircraft from the location data.

Example 17 includes the system of Example 16, wherein the score is calculated based on the count number of the ground stations, and the location of the one or more of the ground stations.

Example 18 includes the system of any of Examples 12-16, wherein when the monitoring ends, the method further comprising calculating and saving a total count number of the uplink messages.

Example 19 includes the system of Example 18, wherein the score is calculated based on the count number of the ground stations, and the total count number of the uplink messages.

Example 20 includes the system of Example 18, wherein the score is calculated based on the count number of the ground stations, the total count number of the uplink messages, and any available location data for the ground stations.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for datalink communications, the system comprising:
   a processor onboard an aircraft;
   a datalink router onboard the aircraft and in operative communication with the processor; and
   a non-transitory computer readable medium having instructions stored thereon, executable by the processor, to perform a method comprising:
      monitoring, in the aircraft during flight, very high frequency (VHF) uplink messages sent to one or more other airborne vehicles from a plurality of ground stations in a VHF datalink network coverage area, wherein each of the ground stations provide their own unique identification;
      maintaining ground station data including a count number of the ground stations identified during the monitoring;
      when the monitoring ends, analyzing the ground station data to determine the count number of the ground stations;
      calculating a score based on the ground station data;
      determining whether the score is less than a threshold value; and
      transmitting one or more downlink messages from the aircraft over a different available network, rather than via VHF, when the score is less than the threshold value.

2. The system of claim 1, wherein the datalink router comprises a communications management unit (CMU), or a communications management function (CMF).

3. The system of claim 1, wherein the different available network comprises a satellite communications (SATCOM) network, a high frequency (HF) network, or other long range communications protocol operative beyond line of sight.

4. The system of claim 1, wherein one or more of the ground stations transmit their location data, which is received and processed by the processor onboard the aircraft.

5. The system of claim 4, wherein analyzing the ground station data includes determining a location of the one or more of the ground stations with respect to the aircraft from the location data.

6. The system of claim 5, wherein the score is calculated based on the count number of the ground stations, and the location of the one or more of the ground stations.

7. The system of claim 1, wherein when the monitoring ends, the method further comprising calculating and saving a total count number of the uplink messages.

8. The system of claim 7, wherein the score is calculated based on the count number of the ground stations, and the total count number of the uplink messages.

9. The system of claim 7, wherein the score is calculated based on the count number of the ground stations, the total count number of the uplink messages, and any available location data for the ground stations.

* * * * *